United States Patent
Kempley (10) Patent No.: US 12,202,625 B2
(45) Date of Patent: Jan. 21, 2025

(54) TUBE-LAUNCHED UNMANNED AERIAL VEHICLE

(71) Applicant: ISS Group Ltd, Newbury (GB)

(72) Inventor: Ryan Kempley, Newbury (GB)

(73) Assignee: ISSE Group Ltd, Newbuy (GB)

( * ) Notice: Subject to any disclaimer, the term of this patent is extended or adjusted under 35 U.S.C. 154(b) by 246 days.

(21) Appl. No.: 17/598,820

(22) PCT Filed: Mar. 27, 2020

(86) PCT No.: PCT/GB2020/050834
§ 371 (c)(1),
(2) Date: Sep. 27, 2021

(87) PCT Pub. No.: WO2020/193991
PCT Pub. Date: Oct. 1, 2020

(65) Prior Publication Data
US 2022/0185501 A1 Jun. 16, 2022

(30) Foreign Application Priority Data

Mar. 28, 2019 (GB) ...................... 1904355

(51) Int. Cl.
*F41F 3/042* (2006.01)
*B64D 27/24* (2006.01)
(Continued)

(52) U.S. Cl.
CPC ............... *B64F 1/04* (2013.01); *B64D 27/24* (2013.01); *B64U 10/14* (2023.01); *B64U 20/50* (2023.01);
(Continued)

(58) Field of Classification Search
CPC ................................ F41F 3/042; B64U 80/70
See application file for complete search history.

(56) References Cited

U.S. PATENT DOCUMENTS 3,978,790 A * 9/1976 Sandelius ............... F42B 10/14
102/388
5,615,847 A * 4/1997 Bourlett .................. F42B 10/14
244/3.28
(Continued)

FOREIGN PATENT DOCUMENTS

GB 2107657 A * 5/1983 ............... F41F 3/042
GB 2498185 A * 7/2013 ............... B64C 3/56
(Continued)

OTHER PUBLICATIONS

International Search Report and Written Opinion of International Application PCT/GB2020/050834, mailed on Aug. 21, 2020, 9 pages.
(Continued)

*Primary Examiner* — Christopher P Ellis
(74) *Attorney, Agent, or Firm* — Seed IP Law Group LLP (57) ABSTRACT

An unmanned aerial vehicle (UAV) 1 of the vertical take-off and landing (VTOL)-type that can be launched from a launcher tube 2 is provided. A launcher 2 for launching the UAV 1 is also provided. The UAV 1 comprises a housing 10 and a transition mechanism 100 for transitioning the UAV 1 between a collapsed configuration for stowing the UAV 1 in a launcher tube 21 and a flight configuration. The housing 10 and the transition mechanism 100 are configured so that one or more rotors 12*a-d* that, in use, are connected to the transition mechanism 100 are located substantially within the housing 10 in the collapsed configuration and outside the housing 10 in the flight configuration. The launcher 2 comprises a hollow tube 21 for receiving a UAV 1 in a collapsed configuration and a trigger mechanism 26 for triggering a propulsion mechanism for propelling the UAV 1 out of an end of the hollow tube 21. A system comprising
(Continued)

both the UAV 1 and the launcher 2, and a kit of part which, when assembled, provide the UAV 1 are also provided.

11 Claims, 10 Drawing Sheets

(51) Int. Cl.
| | | |
|---|---|---|
| *B64F 1/04* | (2006.01) | |
| *B64U 10/14* | (2023.01) | |
| *B64U 20/50* | (2023.01) | |
| *B64U 70/50* | (2023.01) | |
| *B64U 80/70* | (2023.01) | |
| *B64U 30/293* | (2023.01) | |
| *B64U 50/19* | (2023.01) | |
| *B64U 80/86* | (2023.01) | |
| *B64U 101/30* | (2023.01) | |

(52) U.S. Cl.
CPC .............. *B64U 70/50* (2023.01); *F41F 3/042* (2013.01); *B64U 30/293* (2023.01); *B64U 50/19* (2023.01); *B64U 80/70* (2023.01); *B64U 80/86* (2023.01); *B64U 2101/30* (2023.01); *B64U 2201/20* (2023.01)

(56) References Cited

U.S. PATENT DOCUMENTS

| | | | | |
|---|---|---|---|---|
| 6,923,404 | B1* | 8/2005 | Liu ..................... | F42B 10/14 |
| | | | | 244/46 |
| 10,065,726 | B1* | 9/2018 | Phan ..................... | B64D 17/80 |
| 10,479,499 | B2* | 11/2019 | Newman ................ | B64C 27/08 |
| 10,486,830 | B2* | 11/2019 | Kahlon ................ | B64C 39/024 |
| 10,549,850 | B1* | 2/2020 | Ryan ..................... | B64U 50/14 |
| 10,793,265 | B2* | 10/2020 | Tayman ................ | B64U 70/50 |
| 11,040,772 | B2* | 6/2021 | Reddy ................ | B64C 39/024 |
| 2011/0155840 | A1* | 6/2011 | Lind, Jr. ................ | B64C 37/00 |
| | | | | 244/17.11 |
| 2015/0276353 | A1 | 10/2015 | Ueno et al. | |
| 2016/0046372 | A1* | 2/2016 | Barnes ................ | B64U 10/14 |
| | | | | 244/17.19 |
| 2018/0093753 | A1* | 4/2018 | Chow ................ | B64C 27/08 |
| 2018/0170510 | A1* | 6/2018 | Brock ................ | B64U 10/14 |
| 2018/0201356 | A1* | 7/2018 | Cai ..................... | B64U 30/12 |
| 2018/0281939 | A1* | 10/2018 | Tayman ................ | B64C 39/024 |
| 2018/0312254 | A1* | 11/2018 | Ni ..................... | B64C 1/063 |
| 2018/0327092 | A1* | 11/2018 | Deng ................ | B64U 30/293 |
| 2019/0077503 | A1* | 3/2019 | Reddy ................ | B64U 30/29 |
| 2020/0033104 | A1* | 1/2020 | Garst ................ | F42B 12/62 |
| 2022/0388653 | A1* | 12/2022 | Kuperman ............ | B64U 70/20 |
| 2023/0249849 | A1* | 8/2023 | Luong ................ | B64U 20/50 |
| | | | | 89/27.11 |

FOREIGN PATENT DOCUMENTS

| | | | |
|---|---|---|---|
| WO | 2017/037699 A1 | 3/2017 | |
| WO | WO-2018229747 A1 * | 12/2018 | .............. B60L 50/64 |
| WO | 2019/046911 A1 | 3/2019 | |

OTHER PUBLICATIONS

Beaver Works Lincoln Laboratory School of Engineering, "Deployable mini-UAV Project", Spring 2015, 4 pages. URL: https://beaverworks.ll.mit.edu/CMS/bw/deployableminiuavcoursecapstone.

UK Search Report for GB 1904355.3, mailed on Sep. 17, 2020, 3 pages.

\* cited by examiner

TUBE-LAUNCHED UNMANNED AERIAL VEHICLE

TECHNICAL FIELD

The present invention relates to unmanned aerial vehicles, particularly tube-launchable unmanned aerial vehicles of the vertical take-off and landing type.

BACKGROUND

Unmanned aerial vehicles (UAVs), commonly referred to as drones, are aircraft that do not have an on-board pilot to control the aircraft. Instead, a UAV is remotely controlled by a pilot or, in some cases, by an autopilot system. As some of the key enabling technologies have advanced and their costs reduced, ownership and use of UAVs is increasingly common.

There are two main UAV form-factors: fixed-wing and vertical take-off and landing (VTOL). Fixed-wing UAVs have wings which generate lift. VTOL-type UAVs do not have wings, and instead usually have one or more rotors which allow them to take-off, land and hover vertically. The ability to take-off and land vertically and to hover has made VTOL-type UAVs more popular than fixed-wing UAVs because they do not require as much space to take-off and land, and they are typically easier to control. An example of a UAV of the VTOL-type is the popular quadcopter design, which has four rotors. The inventions described herein are concerned with UAVs of the VTOL-type.

A problem with known VTOL-type UAVs is transport and storage, especially for larger UAVs. While weight may not be an issue, a fully-assembled UAV can be physically large: some quadcopters, for example, have a footprint or diameter in excess of a meter and may therefore require a large storage area, may require a vehicle for transport and may require several people to carry. Storing and transporting multiple UAVs can be particularly problematic. Furthermore, the design of VTOL-type UAVs is intrinsically prone to damage to the structure and rotors, especially if the UAV is dropped or handled roughly.

One solution to this problem is to design the UAV so that it can be partially disassembled. This way, the UAV can be carried in a case in a partially disassembled state and then assembled at the point of use. Assembly takes time, however, which can be annoying for hobbyists, cost money for commercial UAV users, and make the UAV unsuitable for applications where it needs to be launched at short-notice.

SUMMARY OF THE INVENTION

It is an object of at least some embodiments the invention to provide a UAV of the VTOL-type that can be easily stored and carried, and that at the same time can be quickly and easily launched without a prolonged assembly. A dedicated launching system for launching and at least temporarily storing the UAV is also provided.

The invention is defined in the independent claims to which reference is now directed. Preferred features are detailed in the dependent claims.

According to one aspect of the present invention, there is provided a tube-launchable UAV of the VTOL-type. The UAV comprises a housing and a transition mechanism for transitioning the UAV between a collapsed configuration for stowing the UAV in a launcher tube and a flight configuration for flight. The housing and transition mechanism are configured so that one or more rotors that, in use, are connected to the transition mechanism are located substantially within the housing in the collapsed configuration and outside the housing in the flight configuration.

By providing a separate physical configuration in which the rotors (and, optionally, the transition mechanism itself) are located substantially internally within a housing that forms a body of the UAV, the UAV can assume a smaller and more compact profile for storage and a more aerodynamic profile for launch. This allows the UAV, and an associated launcher, to be carried much more easily, and for the UAV to be launched faster and farther due to reduced aerodynamic drag. Tumbling associated with the aerodynamic drag caused by the rotors and the rotor support structures is reduced during launch, as the UAV can remain in the collapsed configuration during at least an initial part of the launch flight path. Furthermore, the UAV is made more resistant to damage during storage and launch because the rotors and rotor support structures are protected within the housing.

The transition mechanism may be configured so that it moves, for example translates or extends, in a single plane as it transitions between the collapsed configuration and the flight configuration. For example, the transition mechanism may comprise a scissor folding mechanism. A scissor folding mechanism has relatively few moving parts, and the transition only involves movement in one plane. This makes the transition mechanism reliable and rugged.

The transition mechanism may be spring-loaded, by spring or other resilient means, such that the UAV automatically transitions from the collapsed configuration to the flight configuration when the transition mechanism is actuated. The force provided by a spring-loaded mechanism may reduce the likelihood of the mechanism becoming stuck, which would be liable to cause the UAV to crash after launch. Further, it avoids the need to provide electrical power to the transition mechanism, which reduces power consumption and therefore increases the UAV's range.

The transition mechanism may be configured so that the transition from the collapsed configuration to the flight configuration is symmetrical about one or more plane or axis that pass through the housing. A symmetrical transition reduces instability that could cause the UAV to tumble during and after the transition from the collapsed configuration to the flight configuration.

The transition mechanism may house electrical connections for connecting one or more electric motors that power the one or more rotors to an electrical power supply of the UAV. This can improve the reliability of the electrical connections, and can avoid problems such as electrical cables becoming tangled in the transition mechanism.

The UAV may be configured to connect, in use, to a plurality of rotors. Two or more of the rotors may be distributed along the length of the UAV. That is, a plurality of rotors of the UAV may be distributed along the direction parallel to the intended launch (and forward flight) direction of the UAV.

The UAV may be configured to automatically actuate the transition mechanism after the UAV has been launched and a predetermined condition has been met. For example, the transition mechanism may be automatically actuated when the UAV has reached a predetermined height. The transition mechanism may also be automatically actuated when the UAV has reached an apogee of its launch flight path (that is, within an operationally acceptable range of the apogee, such as within a predetermined distance or percentage of the apogee). An automatically actuated transition mechanism reduces the risk of an ill-timed manual actuation that could damage, or at least result in the loss of control of, the UAV. The apogee is the point of maximum vertical height and minimum speed of the launch flight path, so actuating the transition mechanism at this point (or within an operationally acceptable range of the apogee) maximises the use of the good aerodynamic properties of the collapsed configuration and minimizes aerodynamic tumbling of the UAV that may occur after the transition to the flight configuration.

The UAV may further comprise a sensor or sensors for sensing when the predetermined condition has been met. For example, the UAV may comprise a sensor for sensing it altitude (or height above the ground) or for sensing that is at the apogee of its launch flight path, or within an operationally acceptable range thereof. Examples of sensors include an accelerometer (with a vertical acceleration of zero indicating apogee), a rate of change altitude sensor (with a rate of change of altitude of zero indicating apogee), and a GNSS (e.g. GPS) receiver or other location system whose data can be used to determine the UAV has stopped climbing.

The UAV may further comprise a sensor or sensors for sensing the attitude or orientation of the UAV. For example, the UAV may comprise a sensor, such as a MEMS sensor, for sensing whether or not the UAV is inverted. The UAV may be configured to actuate the transition mechanism when the UAV is not inverted, for example when the UAV is within a predetermined acceptable range of orientations.

The UAV may be configured to activate an automatic tumble recovery system after the transition mechanism has been actuated. An automatic tumble recovery system, which may be implemented as part of an autopilot system of the UAV, works to place the UAV in stable, non-tumbling, flight so that it can be controlled either manually or by an autopilot. Utilizing a tumble recovery system reduces the risk of a UAV crash, as even with a well-timed actuation of the transition mechanism 100, the UAV 1 may begin to tumble due to its speed and the change in the aerodynamic profile of the UAV.

The UAV may be configured to receive or to be connected to a detachable battery. This allows a depleted battery to be quickly changed so that the UAV can be relaunched without the need to recharge the entire unit.

The UAV may further comprise a switch mechanism, wherein actuating the switch mechanism electrically isolates electrically powered components of the UAV from an electrical power source of the UAV or causes electrically powered components of the UAV to be electrically connected to the electrical power source of the UAV. For example, the housing may be configured to receive a removable member such as a pin or other elongate member, wherein electrically powered components of the UAV are electrically isolated from an electrical power source of the UAV when the member is received within the housing, or wherein electrically powered components of the UAV are electrically isolated from an electrical power source of the UAV when the member is removed from the housing. As another example, the switch mechanism may be a magnetic switch actuated a magnetic element. The use of a switch mechanism may allow a battery that powers the UAV to be kept electrically isolated from the electrically powered components right up until the point of launch. This prevents the slow drain of the battery, which may be a problem if the UAV is stowed in a launcher (or stored elsewhere) for an extended period of time prior to launch.

The housing may comprise a portion for receiving a payload and/or sensor electronics. For example, the housing may comprise a portion for receiving a camera and/or another image gathering mechanism. This allows the functionality of the UAV to be enhanced, and potentially adapted for different uses.

The housing may be elongate in the launch direction of the tube-launchable UAV. For example, the housing may be substantially cylindrical with the axis of the cylinder aligned with the launch direction. An elongate shape, combined with the housing of the rotors in the collapsed state, improves the aerodynamic properties of the UAV. This allows the UAV to be launched faster and farther.

The transition mechanism may be integral with or connected to a portion of the housing such that the portion of the housing moves when the transition mechanism is actuated and substantially seals the housing in the collapsed configuration. Sealing the housing in the collapsed configuration improves the aerodynamic profile of the UAV for launch, which allows the UAV to be launched faster and farther.

A kit comprising parts which, when assembled, provides the UAV described above is also provided.

A launcher configured for use with the UAV described above is also provided.

According to another aspect of the present invention, there is provided a launcher for launching a UAV of the VTOL-type. The launcher comprises a hollow tube for receiving a UAV in a collapsed configuration and a trigger mechanism for triggering a propulsion mechanism for propelling the UAV out of an end of the hollow tube.

The launcher may comprise a switch mechanism, wherein the trigger mechanism cannot be triggered until the switch mechanism is actuated. The switch mechanism may comprise a mechanical or a magnetic switch. As one specific example, the launcher may be configured to receive a removably insertable member such as a pin or other elongate member, wherein the trigger mechanism cannot be triggered when the member is received within the launcher but can be triggered when the member is removed from the launcher. Alternatively, the trigger mechanism can be triggered when the member is received within the launcher but cannot be triggered when the member is removed from the launcher. Such a safety mechanism reduces the risk of an accidental launch.

The launcher may comprise a switch mechanism, wherein actuating the switch mechanism electrically isolates electrically powered components of the UAV from an electrical power source of the UAV or causes electrically powered components of the UAV to be electrically connected to the power source of the UAV. The switch mechanism may comprise a mechanical or a magnetic switch. For example, the launcher may be configured to receive a removably insertable member such as a pin or other elongate member, wherein removing the member from the launcher causes electrically powered components of the UAV to be electrically connected to an electrical power supply of the UAV. Alternatively, inserting the member into the launcher causes electrically powered components of the UAV to be electrically connected to an electrical power supply of the UAV. In this way, a slow drain of the battery of the UAV, which may be an issue if the UAV is stowed in the launcher for a prolonged period, is avoided.

The launcher may comprise a switch mechanism, wherein the trigger mechanism cannot be triggered until the switch mechanism has been actuated, and wherein actuating the switch mechanism causes electrically powered components of the UAV to be electrically connected to an electrical power supply of the UAV. The switch mechanism may comprise a mechanical or a magnetic switch. For example, the launcher may be configured to receive a removably insertable member such as a pin or other elongate member, wherein the trigger mechanism cannot be triggered when the member is received within the launcher but can be triggered when the member is removed from the launcher, and wherein removing the member from the launcher causes electrically powered components of the UAV to be electrically connected to an electrical power supply of the UAV. Alternatively, the trigger mechanism can be triggered when the member is received within the launcher but cannot be triggered when the member is removed from the launcher, and inserting the member into the launcher causes electrically powered components of the UAV to be electrically connected to an electrical power supply of the UAV. By combining a safety mechanism and the isolation mechanism, the battery is kept isolated from the powered components right up until the point of launch. This is particularly effective at reducing the slow drain of the UAV's battery.

The trigger mechanism may comprise a rotatable trigger ring which, when rotated, triggers the propulsion mechanism. The launcher may be configured to receive a removably insertable member such as a pin or other elongate member through the rotatable trigger ring, wherein the trigger ring cannot be rotated when the member is received through the trigger ring but can be rotated when the member is removed. Such a mechanism readily allows the safety mechanism and power isolation mechanism, if present, to be combined.

The propulsion mechanism may comprise a replaceable charge, such as a single-use charge that is replaced after each use of the launcher. The use of a replaceable charge allows the launcher to be placed in an inert, safe state in which it cannot be launched.

The launcher may further comprise the propulsion mechanism. The propulsion mechanism may comprise a gas generating charge, for example an electrically triggered charge such as a nitroguanadine charge. Nitroguanadine and similar mixtures are particularly preferred because they are stable and have a long shelf-life. Alternatively, the propulsion mechanism may comprise a cold gas charge such as a charge of compressed nitrogen. This may be regarded as safer for some applications. The propulsion mechanism may also be a rocket propulsion mechanism, which may permit a faster, longer distance launch or the ability to increase the speed of the UAV before and/or after the transition to the flight configuration.

The launcher may be configured through its size and weight to be carriable by a single person.

The launcher may be attached to or may be adapted for attachment to a ground or airborne vehicle or to a fixed structure.

A vehicle or fixed structure attached to or integral with the launcher described above is also provided.

A container containing a plurality of the launchers described above is also provided.

According to another aspect of the present invention, there is provided a system for launching a UAV of the VTOL-type. The system comprises a launcher and a UAV of the VTOL-type. The launcher comprises a hollow tube for receiving a UAV in a collapsed configuration and a trigger mechanism for triggering a propulsion mechanism for propelling the UAV out of an end of the hollow tube. The UAV is received in the hollow tube of the launcher in the collapsed configuration. The UAV comprises a housing and a transition mechanism for transitioning the UAV between the collapsed configuration and a flight configuration. The transition mechanism and housing are configured so that one or more rotors that, in use, are connected to the transition mechanism are located substantially within the housing in the collapsed configuration and outside the housing in the flight configuration.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

The invention will be described in more detail, by way of example, with reference to the accompanying drawings, in which.

Like reference numbers are used for like elements throughout the description and figures.

DETAILED DESCRIPTION OF PREFERRED EMBODIMENTS

An example of a tube-launchable UAV and a launcher for launching the UAV will now be described with reference to FIGS. 1-10.

It will be appreciated that the term "tube-launchable" means that the UAV can be launched from rest by propelling it into the air from a launching tube using a propulsion mechanism that is separate from the UAV's normal propulsion mechanism (its rotors, for example). This is in contrast to a conventional UAV of the VTOL-type, which is first placed on the ground and then takes-off vertically using power from its own rotors. The UAV described herein could, in principle, take-off in the same way as a conventional UAV of the VTOL-type, but a conventional UAV of the VTOL-type cannot be tube-launched.

The rotors and the rotor support structures of UAVs of the VTOL-type cause them to have a relatively large footprint and relatively poor aerodynamic properties, which makes conventional UAVs unsuitable for launching from a tube. To address this and other problems, the UAV described herein is provided with two configurations. The first configuration is a "collapsed configuration" in which the UAV has a small size and good aerodynamic properties, and is used during storage and launch of the UAV. In the collapsed configuration, the rotors are not deployed and do not (and cannot) provide any motive force. The second configuration is a "flight configuration" (which may also be described as an "expanded configuration") in which the rotors are deployed and can power the UAV's flight. The UAV transitions from the collapsed configuration to the expanded configuration after launch via a transition mechanism, which is preferably automatically actuated at or close to the apogee of the UAV's launch path.

Tube-Launchable UAV

Figure 1:
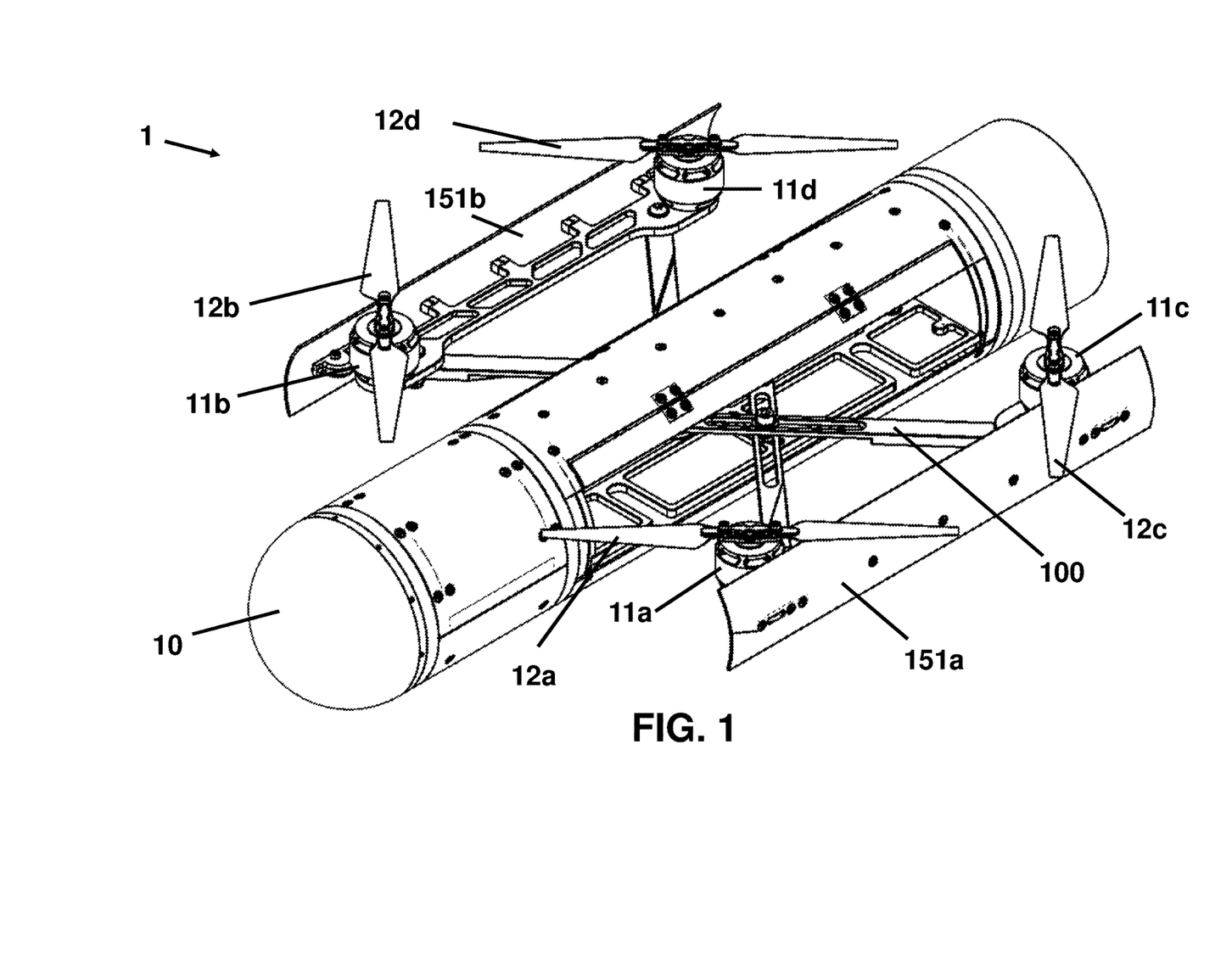
FIG. 1 is a perspective view of a UAV of the VTOL-type in a flight configuration.

FIG. 1 illustrates a tube-launchable UAV 1 of the VTOL-type. The UAV 1 includes a housing 10 which is coupled to a transition mechanism 100. The transition mechanism 100 is coupled to the four electric motors 11a-d which drive the associated rotors 12a-d that provide the UAV's motive force. The electric motors 11a-d are powered by a battery, not visible in FIG. 1, and the electrical conduits or connections between the battery and the motors 11a-d are routed through the transition mechanism 100.

FIG. 1 shows the UAV 1 in an expanded configuration. It is to be understood that the term "expanded configuration" refers to the physical configuration of the UAV 1 when it is capable of being flown using its rotors. In the expanded configuration, the UAV 1 is fully deployed and capable of flying, hovering, landing and taking off.

Figure 2:
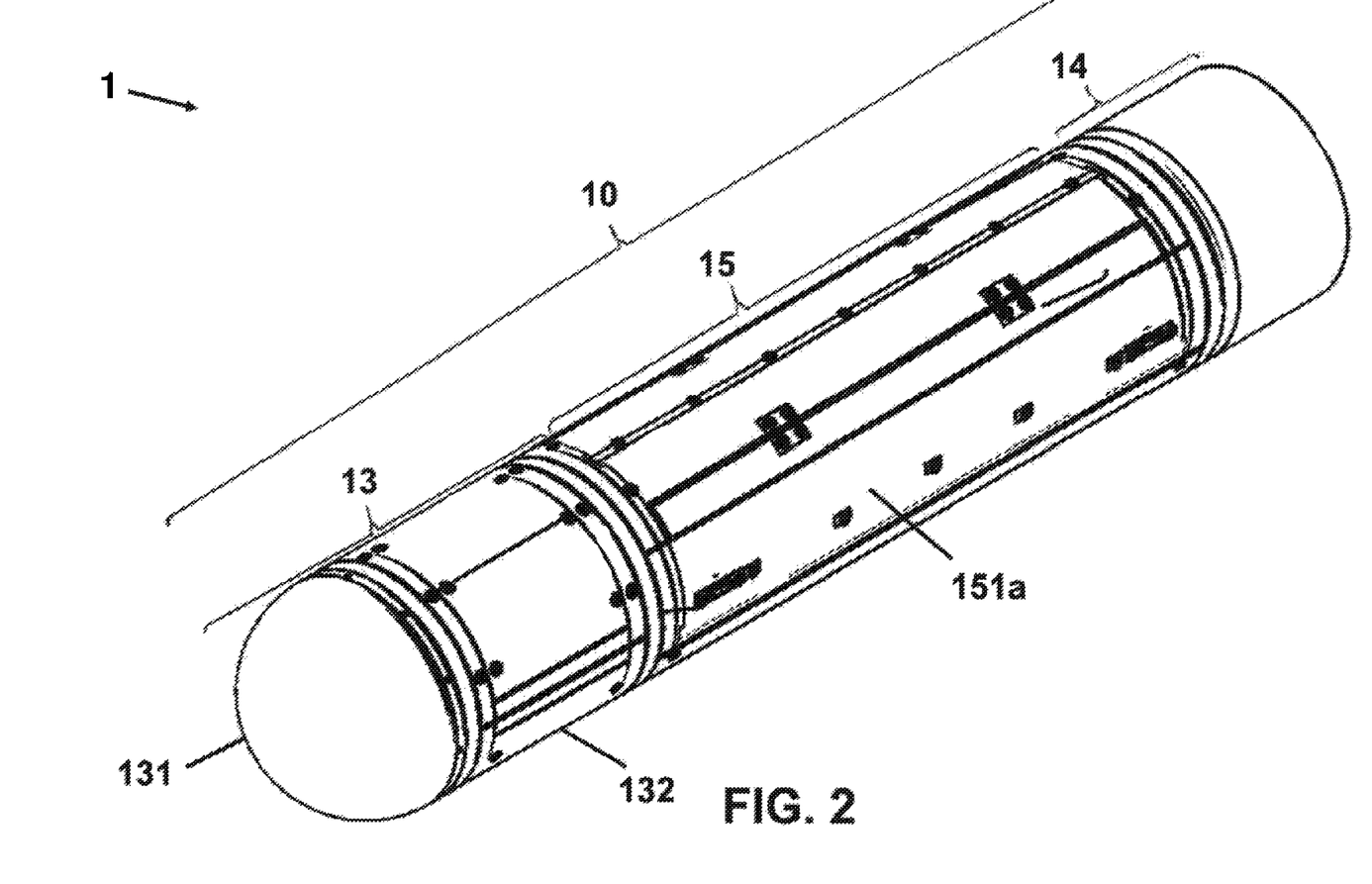
FIG. 2 is a perspective view of the UAV of FIG. 1 in a collapsed configuration.

Now turning to FIG. 2, this illustrates the same UAV 1 but in a collapsed configuration. In the collapsed configuration, the rotors 12a-d, the motors 11a-d and the transition mechanism 100 are collapsed so as to be located substantially within the housing 10. It is to be understood that the term "collapsed configuration" is used in contrast to the term "expanded configuration", and refers to the physical configuration of the UAV 1 when it is not being flown, for example when it is stowed in a launcher. In the collapsed configuration, the rotors 11a-d are stowed within the housing 10 of the UAV 1 and do not provide the UAV with any motive force.

Actuation of the transition mechanism 100 causes the UAV 1 to transition between the collapsed configuration of FIG. 2 and the expanded configuration of FIG. 1. The movement of the transition mechanism during the transition from the collapsed configuration to the expanded configuration is preferably symmetrical about an axis or plane, for example an axis or plane that passes through the housing and about which the housing is substantially symmetrical.

In the example of FIGS. 1-2, the rotors 12a-d, the motors 11a-d and the transition mechanism 100 are stowed entirely internally within the housing 10. While this is preferred because it improves the aerodynamic properties of the UAV 1 during its launch (discussed in more detail below), it is should be appreciated that some part of the transition mechanism 100, motors 11a-d and/or rotors 12a-d could somewhat protrude outside of the housing 10 in the collapsed configuration. What is important is that the drive components (the rotors 12a-d and the motors 11a-d) and their support structure (in the form of the transition mechanism 100 for UAV 1) which in the expanded state contribute significantly to the physical size of the UAV 1 and which make the UAV 1 less aerodynamic, are significantly collapsed so as to be substantially internally within the housing and thereby reduce the physical size of the UAV 1 and improve its aerodynamic properties.

In the illustrated example, the UAV 1 has four rotors, and may therefore be described as a quadcopter. However, the UAV 1 could have greater or fewer than four rotors.

The transition mechanism 100 may, in principle, be any mechanism that is suitable for transitioning the UAV 1 between a collapsed configuration in which the rotors 12a-12d are provided substantially internally within the housing 10 and an expanded configuration in which the rotors 12a-12d are provided outside of the housing 10. Many suitable mechanisms can be envisaged, including mechanisms which, like the mechanism 100 of FIGS. 1-2, translate the rotors 12a-d in a plane substantially perpendicular to the axis of the rotors 12a-d, and other kinds of mechanism which do not translate in this way. The transition mechanism 100 is also preferably spring-loaded so that, once the mechanism is actuated, it automatically transitions from the collapsed state to the expanded state without electrical power.

In the preferred example of FIGS. 1-2, the transition mechanism is a spring-loaded scissor folding mechanism, which will now be described in more detail with reference to FIGS. 3-5.

Figure 3A:
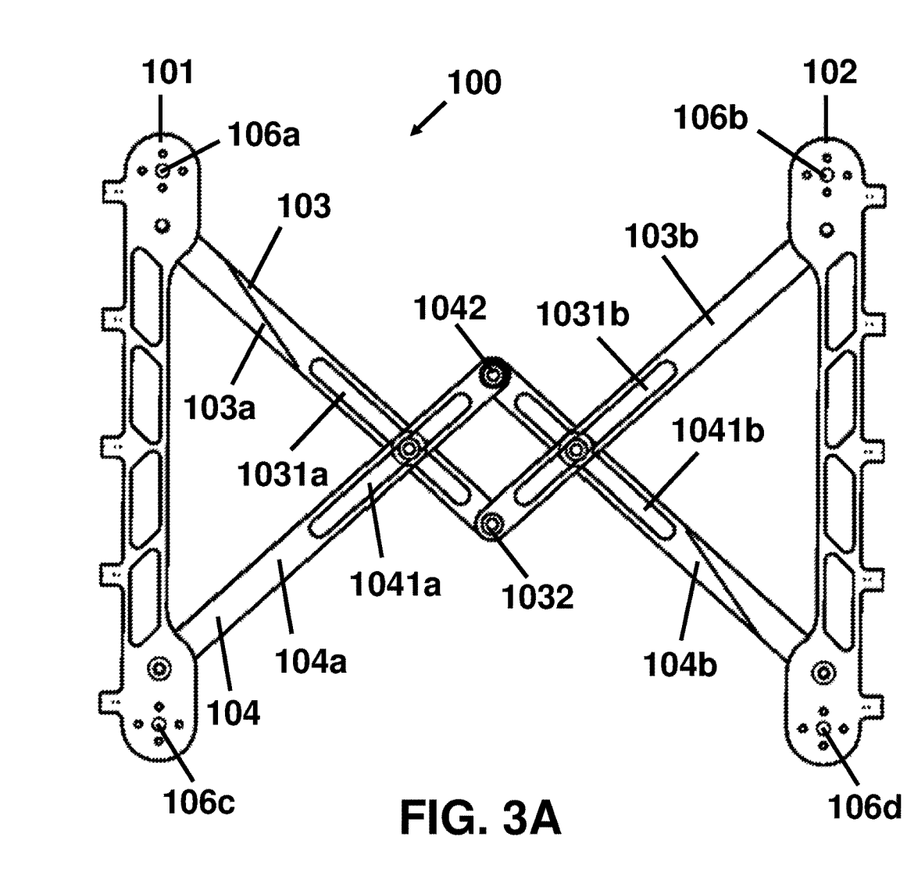
FIG. 3A is a top-down view of a scissor transition mechanism of the UAV of FIGS. 1 and 2, in the flight configuration.

FIG. 3A illustrates the transition mechanism 100 in the expanded configuration. The transition mechanism 100 includes a pair of opposed beams 101, 102, each of which are pivotally attached to one end of each of two jointed scissor arms 103, 104. The two jointed scissor arms 103, 104 each include two sections 103a-b, 104a-b pivotally coupled together by joints 1032, 1042. When the jointed scissor arms 103, 104 bend/straighten by rotation of their sections 103a-b, 104a-b about their joints 1032, 1042, they force the opposed beams 101, 102 together/apart so as to decrease/increase the separation between them. FIG. 3B illustrates the transition mechanism 100 in the collapsed configuration, where the jointed scissor arms 103, 104 are bent (or rotate) about their joints 1032, 1042 to their maximum degree, such that the separation between the opposed beams 101, 102 is as small as possible.

The first jointed scissor arm 103 includes a first section 103a and a second section 103b. A proximal end of the first section 103a is pivotally connected to the first beam 101, and a proximal end of the second section 103b is pivotally connected to the second beam 102. The distal ends of the first and second sections 103a, 103b are pivotally connected to each other to form a joint 1032. Likewise, the second jointed scissor arm 104 includes a first section 104a and a second section 104b. A proximal end of the first section 104a is pivotally connected to the first beam 101, and a proximal end of the second section 104b is pivotally connected to the second beam 102. The distal ends of the first and second sections 104a, 104b are pivotally connected to each other to form a joint 1042.

In order to stabilise the movement of the transition mechanism 100, the movements of the two scissor arms 103, 104 are coupled together. Specifically, each of the two first sections 103a, 104a has a longitudinal slot 1031a, 1041a parallel to its major dimension, and a coupler 105a passing through both longitudinal slots 1031a, 1041a is provided. Likewise, each of the two second sections 103b, 104b has a longitudinal slot 1031b, 1041b parallel to its major dimension, and a coupler 105b passing through both longitudinal slots 1031b, 1041b is provided. In this way, the movement of the two scissor arms 103, 104 relative to one another is limited and coupled, which makes the movement of transition mechanism 100 smoother and more stable.

In this example each scissor arm 103, 104 has two sections 103a-b, 104a-b, but it should be appreciated that each scissor arm 103, 104 could have more than two sections. The number of sections that is suitable may depend, to some extent, on the desired maximum separation of the opposed beams (that is, the separation of the beams in the expanded configuration). This is because increasing the separation of the beams 101, 102 without increasing the number of sections 103a-b, 104a-b could cause the scissor arms 103a, 103b to deform under the weight of the beams 101, 102, motors 11a-d and rotors 12a-d. Preferably, however, the number of sections is two, as this keeps the number of moving parts small. Strong materials, such as aluminium and titanium, can be chosen for the transition mechanism 100 to reduce deformation. It should also be appreciated that, in principle, each scissor arm 103, 104 could have just one section. In this case, the opposed beams 101, 102 may be provided with longitudinal slots to permit the movement of the scissor arms and thereby permit the separation of the beams 101, 102 to be changed. However, the range of separations achievable with a single section per scissor arm 103, 104 may be limited, so two or more sections 103a-b, 104a-b per scissor arm 103, 104 is generally preferable.

The opposed beams 101, 102 are also provided with fixing points 106a-d for fixing the motors 11a-d to the beams 101, 102 using fasteners such as screws. This is preferable because it readily allows the motors to be removed, maintained and replaced. However, this is not essential and the motors 11a-d can be attached to the transition mechanism 100 in other ways, for example using an adhesive.

Figure 3B:
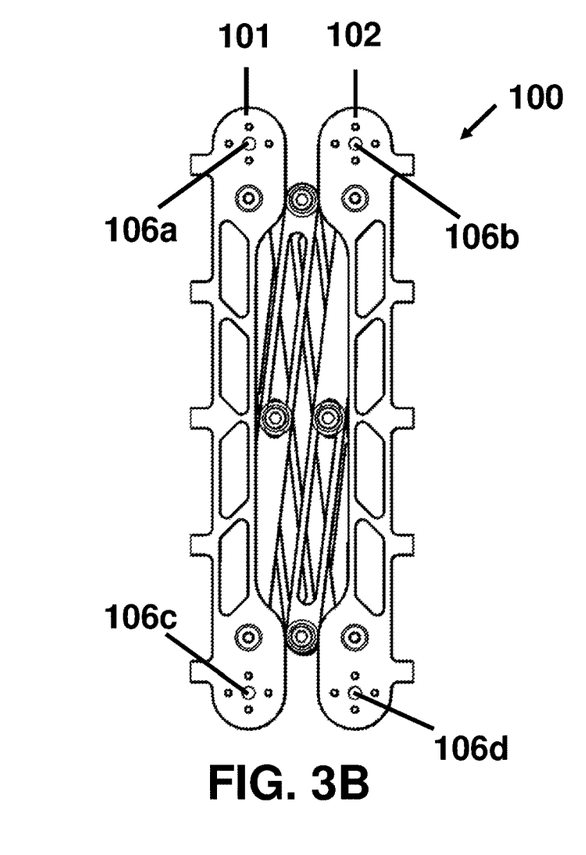
FIG. 3B is a top-down view of the scissor transition mechanism of FIG. 3A but in the collapsed configuration.
Figure 4A:
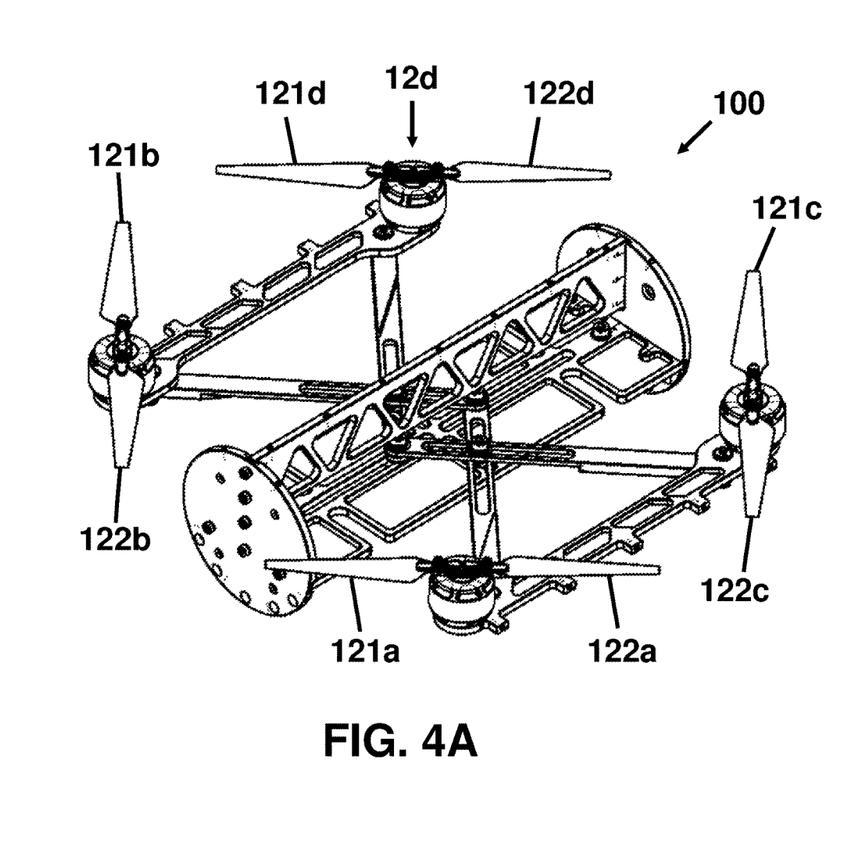
FIG. 4A is a perspective view of the scissor mechanism of FIGS. 3A and 3B in the flight configuration, further showing motors, rotors and a support structure of the UAV.
Figure 4B:
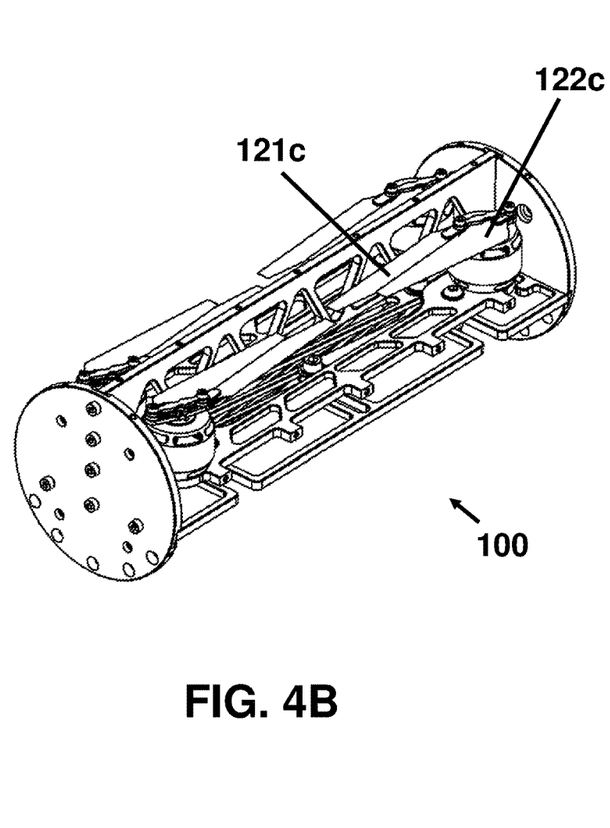
FIG. 4B is a perspective view of the mechanism shown in FIG. 4A, but in the collapsed configuration.
Figure 5A:
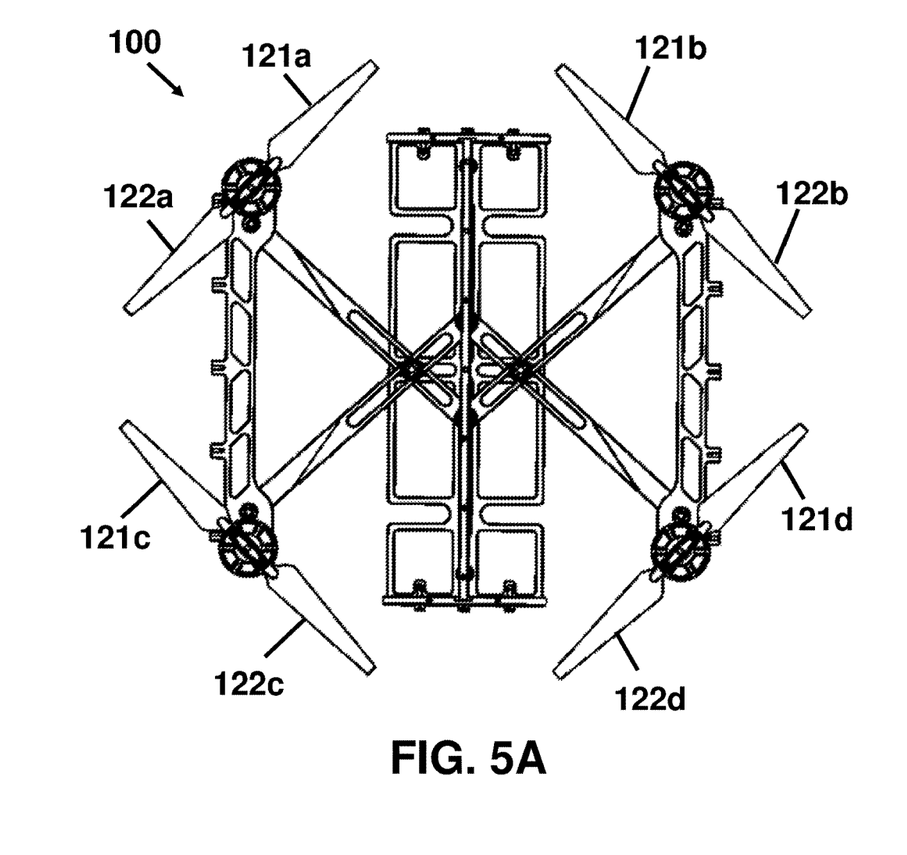
FIG. 5A is a top-down view of the scissor transition mechanism shown in FIG. 4A.
Figure 5B:
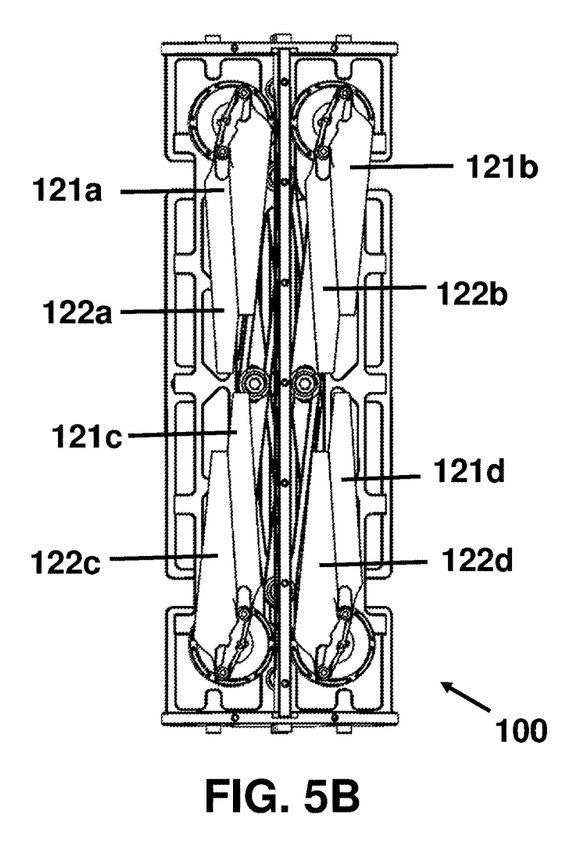
FIG. 5B is a top-down view of the scissor transition mechanism shown in FIG. 4B.

FIGS. 4A-B and FIGS. 5A-5B illustrate the transition mechanism 100 of FIGS. 3A-3B, but with the motors 11a-d, rotors 12a-d and some additional supporting structural components of the housing 10 also shown. Of particular note is the configuration of the rotors 12a-d in FIGS. 4B and 5B, where the mechanism 100 is in the collapsed configuration. As can be seen from FIGS. 4A and 5A, each of the rotors 12a-d includes two sections 121a-d, 122a-d which, in use in the expanded configuration, are provided on opposite sides of the axis of rotation of the rotor 12a-d. As can be seen from FIGS. 4B and 5B, these two sections 121a-d, 122a-d are configured to fold as the transition mechanism 100 transitions from the expanded configuration to the collapsed configuration so that the rotors can be housed within a smaller internal volume of the housing 10. Conversely, the two sections 121a-d, 122a-d of the rotors 12a-d are configured to unfold as the transition mechanism 100 transitions from the collapsed configuration to the expanded configuration so that the rotors 12a-d are deployed ready for flight.

Now returning to FIG. 2, it can be seen that the housing 10 is elongate in a direction parallel to the intended direction of launch and flight of the UAV 1, and in particular is substantially cylindrical. The elongate shape improves the aerodynamic properties of the UAV 1, particularly during its launch when it is in the collapsed configuration. This increases the launch speed and distance which can be achieved. FIG. 2 also shows that the housing 10 may be considered to comprise three main portions: a front portion 13, a rear portion 14 and a middle portion 15. These are further illustrated in FIGS. 6A-6B, which are side- and top-down cross-sectional views of the UAV 1 of FIG. 2.

The middle portion 15 is hollow and houses the transition mechanism 100, motors 11a-d and rotors 12a-d when the UAV 1 is in the collapsed state. The middle portion 15 also includes a pair of panels 151a-b (shown in FIGS. 1-2) which are coupled to the transition mechanism 100 and are configured to seal the middle portion 15 when the UAV is in the collapsed state. Sealing the middle portion 15 further improves the aerodynamic properties of the UAV 1 during launch, and also helps protect the motors 11a-d, rotors 12a-d and transition mechanism 100 against the ingress of moisture and other external material.

Figure 6A:
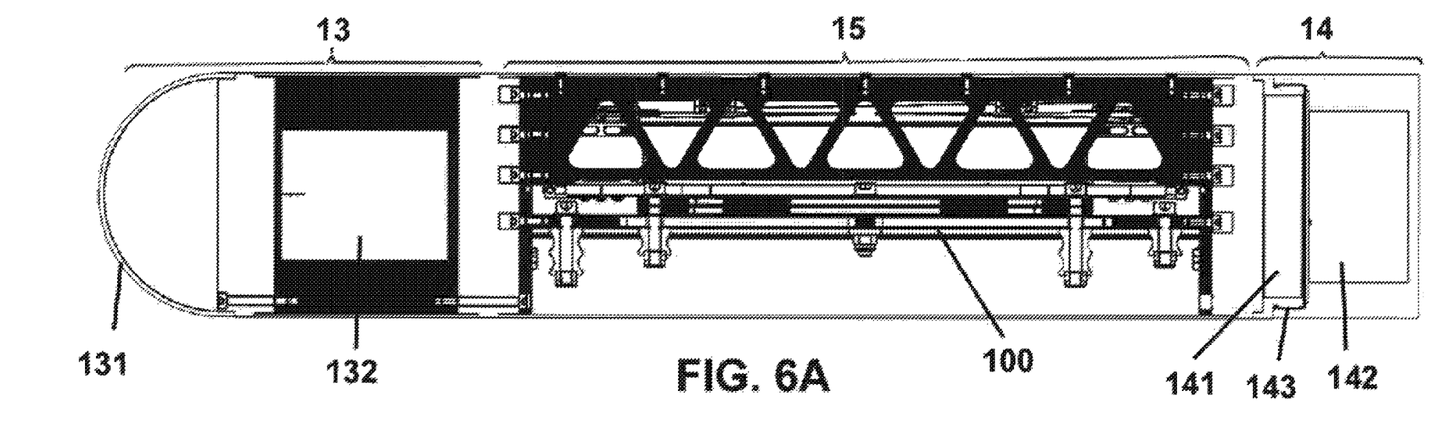
FIG. 6A is a cross-sectional side view of the UAV of FIGS. 1 and 2, in the collapsed configuration.
Figure 6B:
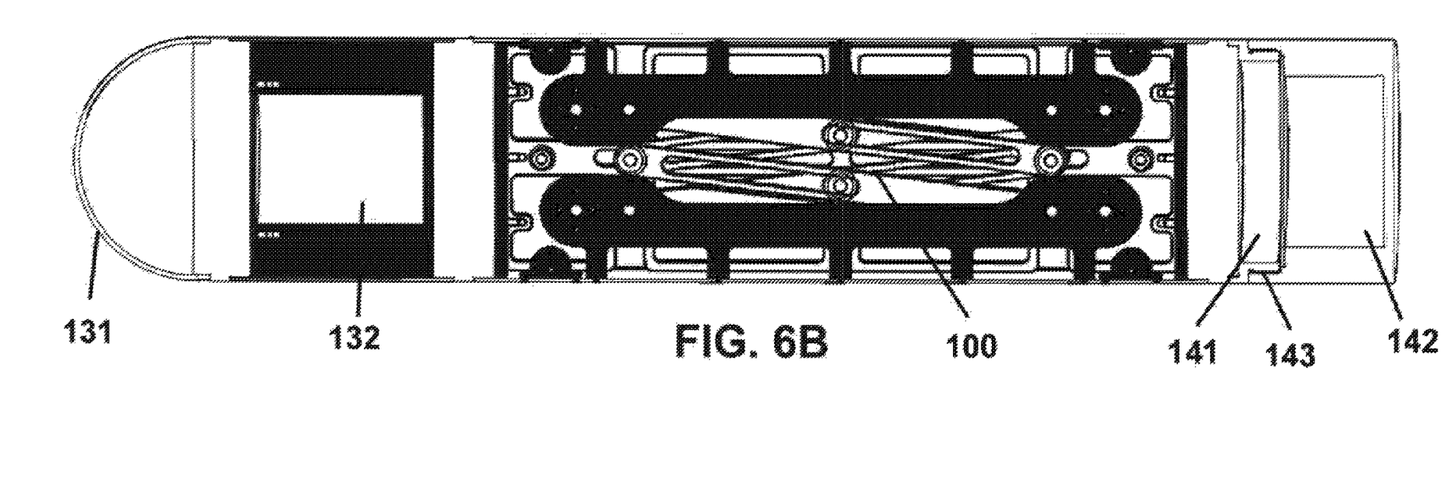
FIG. 6B is a cross-sectional top-down view of the UAV of FIGS. 1 and 2, in the collapsed configuration.

The front portion 13 houses components of the UAV 1 that provide additional functionality. For example, the front portion 13 may house any combination of a camera, radio and/or other communication electronics, various sensor and processing electronics such as laser range finders and optical flow cameras, and a payload. If a payload is present, its nature will depend on the intended application. The payload could, for example, be a sensor beacon that is to be dropped for environmental monitoring, or an item or package that is to be delivered.

In this example, the front portion 13 includes a transparent dome 131 and a payload receiving portion 132. The transparent dome 131, which can be made of glass or any other material that is transparent to light of a desired wavelength, provides an unobstructed view to a camera that is provided within the front portion 13. The payload receiving portion 132 may be adapted to receive a payload of a particular type according to the intended application, and can preferably be externally accessed so that the payload can be removed, replaced and maintained.

The rear portion 14 houses the battery (not shown) that powers the motors 11a-d and the other electrically powered components of the UAV, such as the camera. Preferably the rear portion 14 includes two parts: a UAV-side portion 141 and a battery-side portion 142, which are removably attached to each other by an attachment mechanism 143. In the example of FIGS. 6A-6B, the attachment mechanism 143 is a screw mechanism, with threading on a male member of the UAV-side portion 141 and a female member of the battery-side portion 142. A two-part rear portion 14 facilitates the use of replaceable battery packs, with the battery-side portion 142 effectively being or housing a battery pack.

As will be described in more detail below with reference to FIGS. 7-10, the UAV 1 preferably provides a mechanism that isolates the electrically powered components of the UAV from the battery until the isolation mechanism is disengaged. In a preferred example, the housing 10 includes an aperture which is configured to receive a member, for example a pin or other elongate member, which causes the electrically powered components of the UAV to be isolated from the battery until the member is removed from (or, alternatively, inserted into) the aperture. Such a mechanism avoids slow-draining of the battery while the UAV 1 is not being used, for example when it stowed in a launcher tube.

Having described the UAV 1, a launcher for launching the UAV 1 will now be described with reference to FIGS. 7-10.

Controller

The operator of the UAV 1 can be provided with a controller that allows them to see a video image relayed from the UAV 1. The UAV 1 may also be controlled by an autopilot configured with a predetermined flight profile. The controller can allow the operator to take over control at any point and to provide manual instructions.

The controller and UAV 1 may exchange signals in a number of different ways, including cellular means, Wi-Fi (Registered Trade Mark), high or low frequency RF, satellite and laser. There may or may not be an intermediate node between the UAV 1 and the controller.

Launcher

Figure 7:
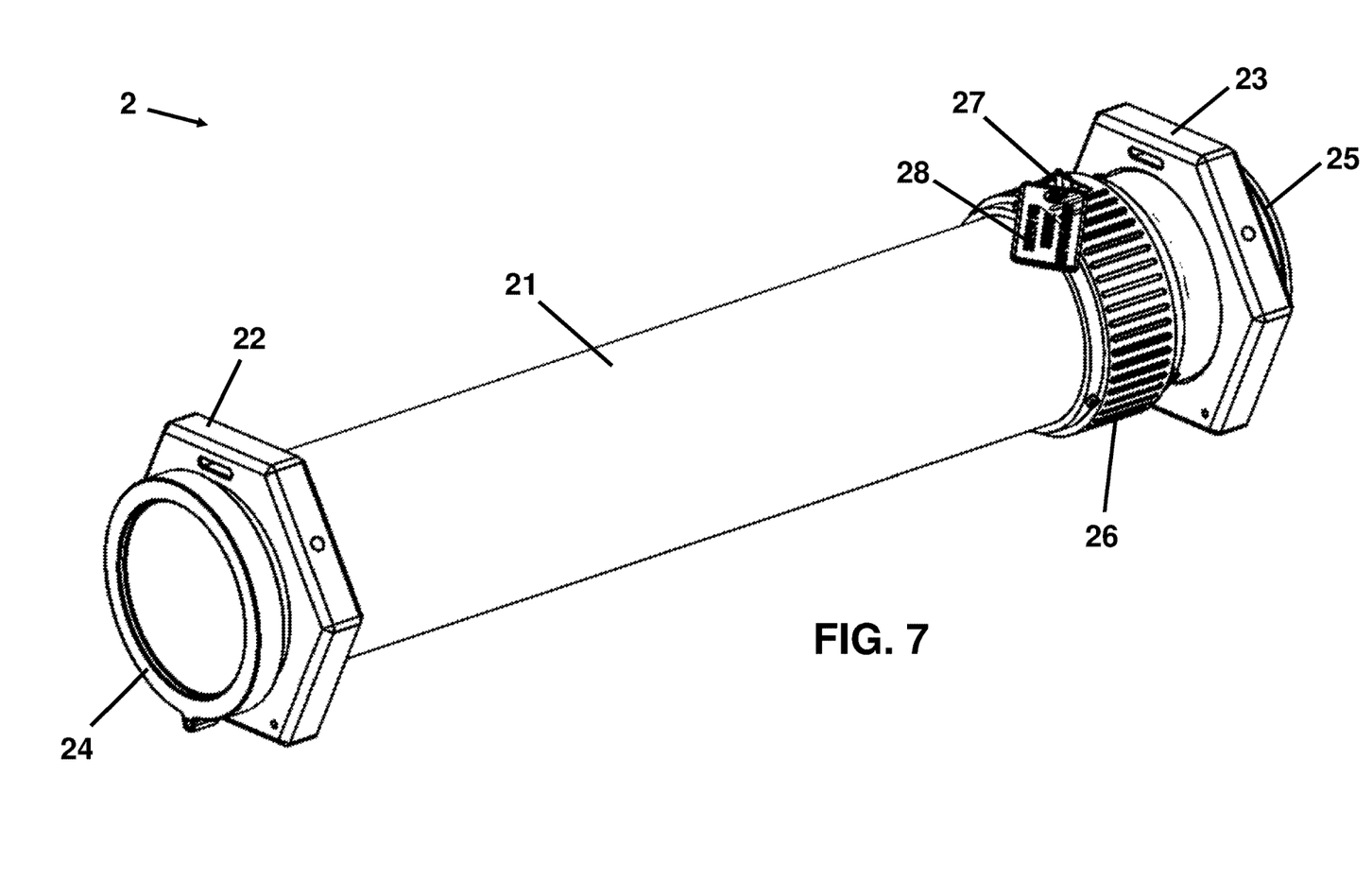
FIG. 7 is a perspective view of a launcher for launching the UAV of FIGS. 1-6.

FIG. 7 shows the launcher 2, which includes a hollow tube 21, a front bumper 22, a rear bumper 23, a removable front end cap 24, a removable rear end cap 25, a trigger mechanism 26, a safety mechanism 27, and a safety tag 28.

The hollow tube 21 is the barrel of the launcher 2, and receives the UAV 1 in the collapsed configuration. The dimensions of the tube 21 will therefore be adapted to those of the UAV 1. The internal diameter, in particular, of the tube 21 will be approximately the same as the external diameter of the UAV 1 when in the collapsed configuration. This is to efficiently use the launching force provided by the launcher 2, which will typically be provided by the expansion of a gas in the tube 21. The internal diameter of the tube 21 may also include guide means for guiding the UAV 1 into the tube, especially if the UAV is to be received in a particular orientation.

The front and rear bumpers 22, 23, which have a hexagonal shape in this example, provide additional structure and strength to the launcher 2 and reduce the likelihood of the hollow tube 21 being dented or otherwise damaged if the launcher 2 is dropped, for example. The front end cap 24, which will typically be removed when the UAV 1 is to be launched or is to be loaded into the hollow tube 21, prevents the ingress of external material. In another example, the front end cap 24 is retractable, or is frangible or otherwise configured to break when the UAV is launched, such that the front end cap 24 does not necessarily need to be removed.

The rear end cap 25 can be removed to provide access to internal mechanisms of the launcher 2, particularly a propulsion mechanism of the launcher 2 which is provided behind the rear end of the UAV 1 when the UAV is received in the tube 21. Briefly turning to FIGS. 9B and 10B, which show the launcher 2 in cross-section, the launcher 2 includes a space 29 for housing the propulsion mechanism.

A variety of different propulsion mechanisms could be utilized, and the most appropriate will depend to some extent on the intended application. In a preferred example, a single-use, replaceable gas-generating launch charge is used. Examples of such charges include electrically-triggered charges such as nitroguanadine, similar to the gas-generating mixture used in airbags. Other example propulsion mechanisms include:

A cold gas charge, such as a charge of compressed gas (nitrogen, for example). A cold gas charge may utilize a dump valve type system.

A rocket propulsion system. In this case, the rear-end of the UAV 1 may be configured with a rocket motor. The rocket motor would be utilized for launching the UAV, with the subsequent flight being under the power of the motors 11*a-d* and rotors 12*a-d* and not the rocket motor. The rocket motor or another unused rocket motor may be utilised to speed up the UAV 1 at a point in its flight determined by the operator, before and/or after the transition from the collapsed configuration to the flight configuration.

Using a propulsion mechanism that is removable (a single-use, replaceable charge, for example) is preferred as it allows the launcher 2 to be placed in a safe, inert state in which it cannot be inappropriately or accidently fired.

The trigger mechanism 26 is used to trigger the propulsion mechanism. In the illustrated example, the trigger mechanism 26 takes the form of a rotatable annular ring 26 whose rotation (by a quarter turn, for example) triggers the propulsion mechanism. The link between the trigger and the propulsion mechanism will depend on the type of propulsion mechanism that is used. If an electrically-triggered gas-generating mixture is used, the rotation of the trigger 26 may induce an electrical charge that triggers the gas-generating mixture.

The safety mechanism 27, described in more detail below with reference to FIGS. 9B and 10A-10B, prevents the trigger mechanism 26 from being triggered accidently. The safety tag 28, which in this case is attached to the safety mechanism 27, provides a visual indication to users that the safety mechanism 27 must be deactivated before the trigger mechanism 26 can be used.

Figure 8A:
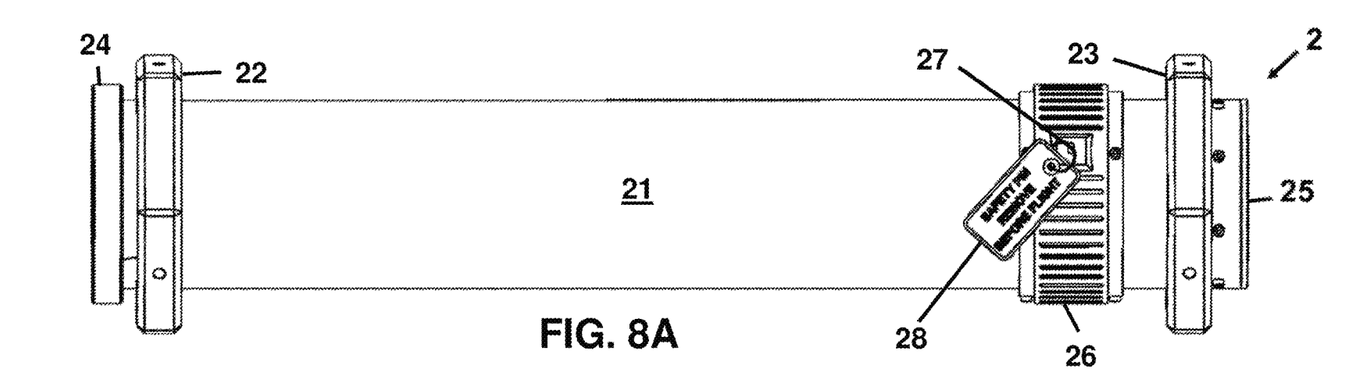
FIG. 8A is a top-down view of the launcher of FIG. 7.
Figure 8B:
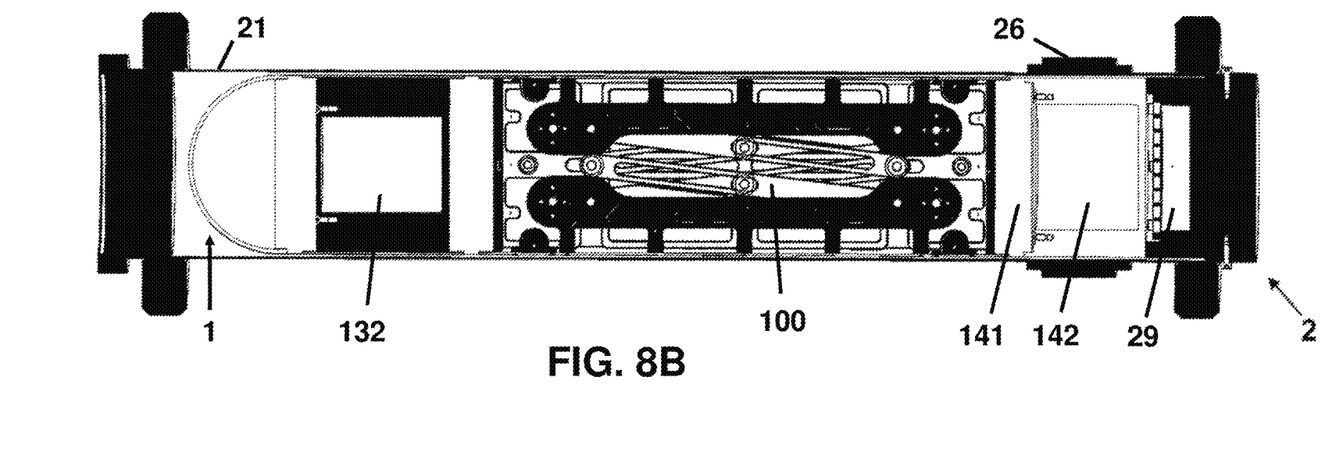
FIG. 8B is a cross-sectional top-down view of the launcher of FIGS. 7 and 8A, showing the UAV of FIGS. 1-6 within the launcher.

Now turning to FIGS. 8A-8B and 9A-9B, these show top-down and side views of the launcher 2 of FIG. 7, with FIGS. 8B an 9B being cross-sectional views in which the UAV 1 can be seen stowed within the tube 21 of the launcher 2. As noted above, the external diameter of the UAV 1 is substantially the same as the internal diameter of the hollow tube 21 of the launcher 2. In this example, the length of the UAV 1 in the direction of launch and flight is substantially the same as, but slightly less than, the length of the hollow tube 21.

Figure 9A:
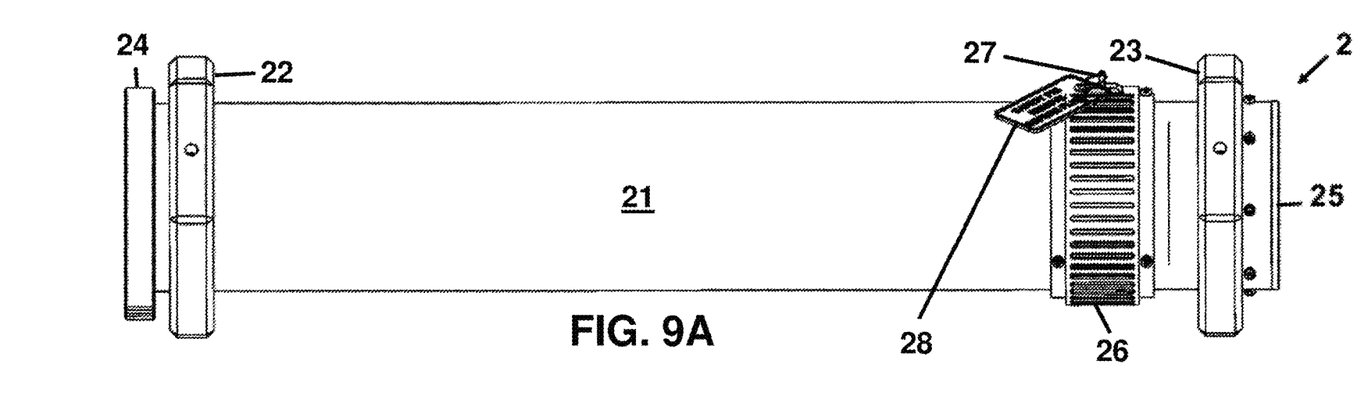
FIG. 9A is a side view of the launcher tube of FIG. 7.
Figure 9B:
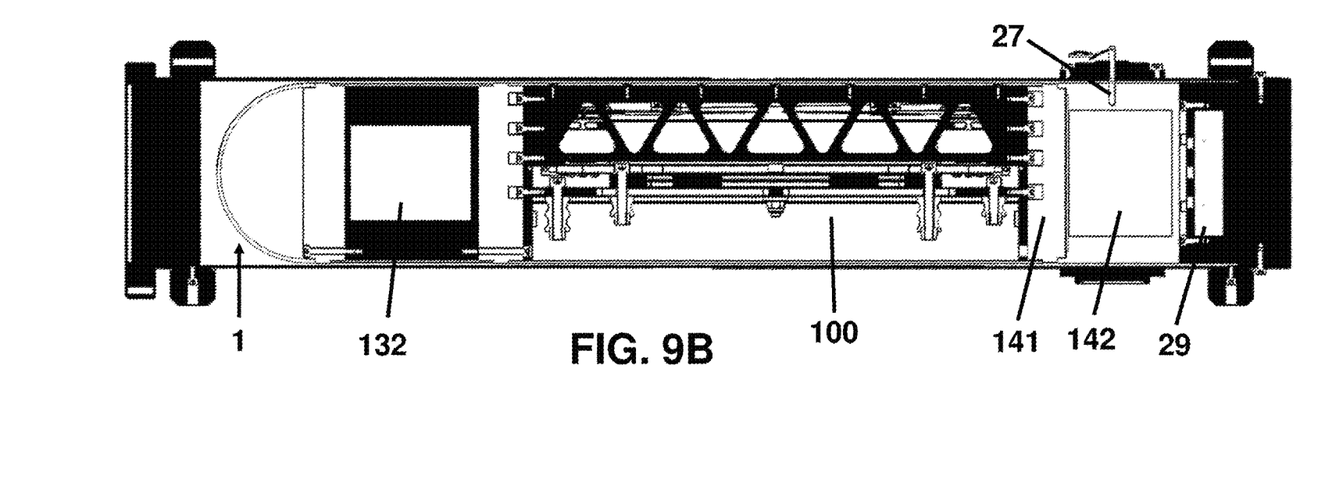
FIG. 9B is a cross-sectional side view of the launcher of FIGS. 7 and 9A, showing the UAV of FIGS. 1-6 within the launcher.

The various components of the UAV 1, described above with reference to FIGS. 1-6, can also be seen in FIGS. 8B and 9B.

Figure 10A:
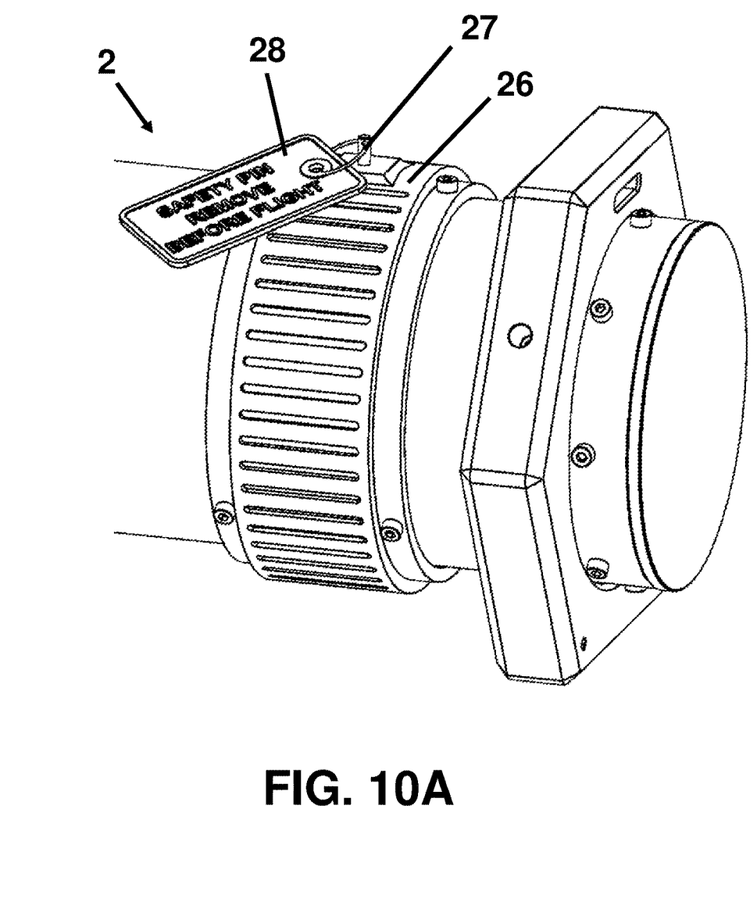
FIG. 10A illustrates the trigger mechanism and safety mechanism of the launcher of FIG. 7 in more detail.
Figure 10B:
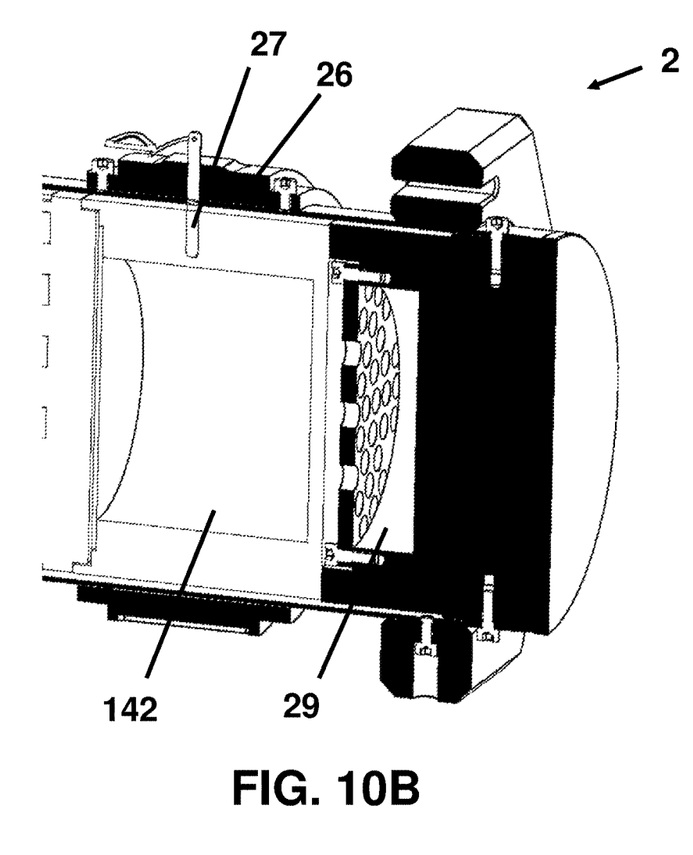
FIG. 10B is a cross-sectional view of FIG. 10A, showing further details of the trigger mechanism and safety mechanism.

FIGS. 9B and 10A-10B more clearly show the safety mechanism 27. In particular, it can be seen that the safety mechanism 27 takes the form of an elongate member 27, such as a pin, that is provided through the rotatable trigger ring 26. Since the elongate member 27 runs through the annular ring 26, the ring 26 cannot be rotated until the elongate member 27 is withdrawn. It will be appreciated that alternative safety mechanisms 27 can be designed for alternative trigger mechanism designs. By way of one specific alternative example, the safety mechanism could take the form of a magnetic switch, which could be actuated by a magnetic element.

It can also be appreciated from the cross-sectional views of FIGS. 9B and 10B that the pin 27 not only passes through the annular ring 26, but penetrates the housing 10 of the UAV 1, for example through an aperture that is provided in the rear portion 14 of the housing 10. In this way, the deactivation of the safety mechanism 26 can be made to coincide with the activation of components of the UAV 1. For example, the removal of the pin 27 from the housing 10 can be made to actuate a switch which connects the battery of the UAV 1 to the electrically powered components. This allows the safety mechanism 27 (in this case the pin) to be utilized as a means of isolating the battery from the electrically powered components of the UAV 1 right up until the point of use, which helps prevent the slow drain of the UAV's battery while it is stowed away in the tube launcher 2.

Launch Method

To prepare the UAV 1 for launch from the launcher 2, the UAV 1 must first be inserted, in the collapsed configuration, into the hollow tube 21 of the launcher 2. To do so, the front end cap 24 of the launcher is removed and the UAV 1 is inserted, rear-portion 14 first, into the tube 21. If the UAV is not to be launched imminently, the front end cap 24 should be replaced and the elongate safety member 27 inserted through the annular trigger ring 26 and into the aperture of the housing 10.

If the UAV 1 was not already in collapsed configuration, it would first be necessary to actuate the transition mechanism 100 to transition the UAV 1 from the expanded configuration to the collapsed configuration. If the transition mechanism 100 is spring loaded as described above, this is done by physically pushing the mechanism 100 into the housing 10. If the battery of the UAV 1 is depleted, it should be charged or replaced prior to its insertion into the tube 21. Likewise, if the payload or any other internal component of the UAV requires replacement or maintenance, this should be done before inserting the UAV 1 into the launcher 2.

With the UAV 1 inside the launcher 2, the propulsion mechanism should be provided within the launcher. The details of this will depend on the propulsion mechanism that is used. In the case of a single-use charge, the rear end cap 25 is removed, the charge inserted into the space 29, and the rear end cap 25 replaced and secured. This may be done prior to inserting the UAV 1 into the tube 21.

To launch the UAV 1, the front end cap 24 may be removed (if present and not frangible, for example) and the elongate safety member 27 withdrawn (if present) to arm the trigger mechanism 26 and to connect the battery of the UAV 1 to its electrically powered components. The trigger ring 26 will now be rotatable. The user of the UAV 1 may perform some checks before rotating the trigger, for example checking that they are receiving a feed from the camera of the UAV 1.

Once the user is satisfied they are ready to launch the UAV 1, they point the launcher 2 into the air in the desired direction. Preferably, the angle should be of the order of 30 to 90 degrees above the horizontal. The user now rotates the trigger ring 26 to trigger the propulsion mechanism.

In the case of a gas-generating charge, triggering the propulsion mechanism will suddenly cause a large volume of gas to be generated in the space 29 behind the UAV 1. Since the rear-end of the tube 21 is sealed by the rear end-cap, pressure will build against the rear portion 14 of the UAV 1 and force the UAV 1 out of the front end of the tube 21.

The UAV 1 is launched out of the end of the launcher 2 in the collapsed configuration, and will remain the collapsed configuration until the transition mechanism 100 is actuated. Preferably, the transition mechanism 100 will not be actuated until the UAV 1 has reached the apogee of its launch path (that is, the vertical maximum of the launch path), as this makes best use of the aerodynamic profile of the UAV's collapsed configuration. In other words, the UAV 1 can be launched faster and further, and with reduced aerodynamic tumbling, if it remains in the collapsed configuration until it reaches the point of the launch path where it at its highest and slowest, which occurs at the apogee. The transition mechanism 100 is also preferably actuated when the UAV 1 is not inverted, or is within of an acceptable range of orientations, such as within a predefined angle measured relative to the intended flight orientation of the UAV.

The transition mechanism 100 may be actuated manually, for example using a button on a remote controller. Alternatively, the UAV 1 may be configured to determine when it is at or close to the apogee of its launch path, and actuate the transition mechanism at or close to the apogee. For example, the UAV 1 may include a sensor (an accelerometer, MEMS device or rate of change altitude sensor, for example) that detects when its vertical acceleration is zero, and use this to actuate the transition mechanism. As another example, the UAV 1 may utilize data from GNSS, such as GPS, or another location system to determine that it is at or close to the apogee of its launch path. Similarly, the UAV 1 may include a sensor that detects the attitude or orientation of the UAV 1, so that transition mechanism 100 is only actuated (manually or automatically) when the UAV's orientation is acceptable.

Even with a well-timed actuation of the transition mechanism 100, the UAV 1 may begin to tumble due to its speed and the change in the aerodynamic profile of the UAV. To alleviate this, the UAV 1 may include, as part of an autopilot system of the UAV, an automatic tumble recovery system that works to recover the UAV 1 into stable flight prior to the beginning of manual control by the remote pilot. Such tumble recovery system are conventionally used to regain control of a UAV following a momentary loss of power, but in this case it is used to gain control following actuation of the transition mechanism after the tube-launch.

With the UAV 1 now in the expanded configuration and in stable flight under the power of its rotors 12*a-d*, it now flown manually or under the control of an autopilot, as is known in the art.

Once the UAV's mission is complete, it can be landed in the expanded configuration and returned to the collapsed configuration for re-insertion into the tube 21.

EXAMPLE IMPLEMENTATIONS

The small form-factor of the collapsed state of the UAV 1 means that the UAV 1 and launcher 2 described herein can be made small enough for a single person to carry, while retaining the advantages and functionality associated with a larger UAV. Indeed, the launcher and UAV may be configured, through their size and weight, to be carriable by a single person. For example, the UAV may be about 500-700 mm long and 100-150 mm in diameter (in the collapsed configuration), with a propeller diameter of about 200-300 mm. Such UAVs would fit into a launcher which is around 700-900 mm long with an external diameter of about 180-220 mm, which is physically small enough for most adults to carry. A kit comprising a launcher, a UAV, three batteries and three launch charges (which is sufficient for three launches and flights each with a duration of about 14-18 minutes) could have a mass of about 7.2-13.5 kg, which is also carriable by most adults.

A gas-generating launch charge, such as a nitroguanadine charge, can propel such a UAV 1 out of the launcher 2 as far as about 200 m, and to a height of about 40-75 m. This is high enough to clear most normal terrain that may immediately surround the launch site (trees and small buildings, for example).

While the system described above may be configured to be carried by a person, other options are possible. For example:

- The launcher 2 may be attached to, or be configured to be attached to, a mount or frame such as a bipod. This would make it easier for a user to perform a controlled launch in a desired direction and mitigate against the recoil of the launcher. It would also facilitate a remote launch of the UAV 1.
- The launcher may be buried in the ground or otherwise concealed to allow covert use of the UAV.
- The launcher may be attached to, or be configured to be attached to, a permanent or semi-permanent structure such as a turret. This could be particularly useful for intercepting hostile or nuisance UAVs (at airports, for example). Again, it would also facilitate a remote launch of the UAV 1.

The launcher may be attached to, or be configured to be attached to, a vehicle using a flush panel mounting or the like. The UAV 1 may be launched from the vehicle, or the vehicle could have a rack of multiple launchers 2 for quickly moving the launchers and UAVs to a launch site.

Multiple launcher tubes could be provided within the body of a container or crate to form a multi-launcher. For example, a multi-launcher in the form of a container containing a 3×2 or 3×3 array of tubes could be provided.

Described above are a number of embodiments with various optional features. It should be appreciated that, with the exception of any mutually exclusive features, any combination of one or more of the optional features are possible.

The invention claimed is:

1. A tube-launchable UAV of a VTOL-type, comprising:
a housing; and
a transition mechanism for transitioning the UAV between a collapsed configuration for stowing the UAV in a launcher tube and a flight configuration, wherein the housing of the UAV is elongate in a direction parallel to an intended direction of launch and a hovering plane of the UAV, and wherein the housing and the transition mechanism are configured so that one or more rotors that, in use, are connected to the transition mechanism are located substantially within the housing in the collapsed configuration and outside the housing in the flight configuration.

2. The UAV of claim 1, wherein the transition mechanism comprises a scissor folding mechanism.

3. The UAV of claim 1, wherein the transition mechanism is spring-loaded such that the UAV automatically transitions from the collapsed configuration to the flight configuration when the transition mechanism is actuated.

4. The UAV of claim 1, wherein the transition mechanism houses electrical connections for connecting one or more electric motors that power the one or more rotors to an electrical power supply of the UAV.

5. The UAV of claim 1, wherein the UAV is configured to automatically actuate the transition mechanism after the UAV has been launched and a predetermined condition has been met.

6. The UAV of claim 5, wherein the predetermined condition is that the UAV has reached an apogee of its launch flight path.

7. The UAV of claim 1, configured to be connected to a detachable battery.

8. The UAV of claim 1, further comprising a switch mechanism, wherein actuating the switch mechanism electrically isolates electrically powered components of the UAV from an electrical power source of the UAV or causes electrically powered components of the UAV to be electrically connected to the electrical power source of the UAV.

9. The UAV of claim 1, wherein the housing comprises a portion for receiving a payload and/or sensor electronics.

10. A kit comprising parts which, when assembled, provides the UAV of any of claim 1.

11. A tube-launchable UAV of a VTOL-type, comprising:
a housing; and
a transition mechanism including a scissor folding mechanism for transitioning the UAV between a collapsed configuration for stowing the UAV in a launcher tube and a flight configuration, wherein the housing and the transition mechanism are configured so that one or more rotors that, in use, are connected to the transition mechanism are located substantially within the housing in the collapsed configuration and outside the housing in the flight configuration.

* * * * *

UNITED STATES PATENT AND TRADEMARK OFFICE
CERTIFICATE OF CORRECTION

| | | |
|---|---|---|
| PATENT NO. | : 12,202,625 B2 | Page 1 of 1 |
| APPLICATION NO. | : 17/598820 | |
| DATED | : January 21, 2025 | |
| INVENTOR(S) | : Ryan Kempley | |

It is certified that error appears in the above-identified patent and that said Letters Patent is hereby corrected as shown below:

On the Title Page

<u>Item (73) Assignee:</u>
"ISS Group Ltd, Newbuy (GB)"
Should read:
--ISS Group Ltd, Newbury (GB)--.

In the Claims

<u>Column 16, Claim 10, Line 24:</u>
"the UAV of any of claim 1."
Should read:
--the UAV of claim 1.--.

Signed and Sealed this
Twenty-ninth Day of July, 2025

Coke Morgan Stewart
*Acting Director of the United States Patent and Trademark Office*